United States Patent
Lee et al.

(10) Patent No.: US 9,966,069 B2
(45) Date of Patent: May 8, 2018

(54) METHOD FOR PROCESSING DIALOGUE BASED ON PROCESSING INSTRUCTING EXPRESSION AND APPARATUS THEREFOR

(71) Applicant: POSTECH ACADEMY-INDUSTRY FOUNDATION, Pohang-si, Gyeongsangbuk-do (KR)

(72) Inventors: Geun Bae Lee, Pohang-si (KR); Dong Hyeon Lee, Gyeongsangnam-do (KR); Jun Hwi Choi, Pohang-si (KR); Yong Hee Kim, Seoul (KR); Seong Han Ryu, Seoul (KR); Sang Jun Koo, Seoul (KR)

(73) Assignee: POSTECH ACADEMY—INDUSTRY FOUNDATION, Pohang-si, Gyeongsangbuk-do (KR)

( * ) Notice: Subject to any disclaimer, the term of this patent is extended or adjusted under 35 U.S.C. 154(b) by 0 days. days.

(21) Appl. No.: 14/775,077

(22) PCT Filed: Dec. 16, 2013

(86) PCT No.: PCT/KR2013/011670
§ 371 (c)(1),
(2) Date: Sep. 11, 2015

(87) PCT Pub. No.: WO2014/142422
PCT Pub. Date: Sep. 18, 2014

(65) Prior Publication Data
US 2016/0042736 A1 Feb. 11, 2016

(30) Foreign Application Priority Data
Mar. 15, 2013 (KR) ........................ 10-2013-0027811

(51) Int. Cl.
*G10L 21/00* (2013.01)
*G10L 25/00* (2013.01)
(Continued)

(52) U.S. Cl.
CPC ................ *G10L 15/22* (2013.01); *G06F 3/01* (2013.01); *G06F 17/20* (2013.01); *G06F 17/279* (2013.01);
(Continued)

(58) Field of Classification Search
None
See application file for complete search history.

(56) References Cited

U.S. PATENT DOCUMENTS 7,117,231 B2 * 10/2006 Fischer ................ H04N 21/235
2005/0021331 A1 * 1/2005 Huang ................ G10L 15/1815
704/231
(Continued)

FOREIGN PATENT DOCUMENTS

KR 1020000031941 A 6/2000
KR 1020070055210 A 5/2007
(Continued)

OTHER PUBLICATIONS

Lee Chul Min, et al; "A Study of Spoken Phrase Detection for Real-time Speech Recognition", Abstract of KICS Conference (Winter), Feb. 2011, p. 42.
(Continued)

*Primary Examiner* — Marcus T Riley
(74) *Attorney, Agent, or Firm* — Ladas & Parry LLP

(57) ABSTRACT

Disclosed are a method for processing a dialog based on processing instructing expression in a multi-modal environment and an apparatus therefor. The method for processing a dialog in an information processing device capable of processing digital signals includes the steps of: extracting an instructing expression from an inputted sentence; generating an intermediate instructing expression representing the modifying relations between the words constituting the extracted instructing expression; and searching the object (Continued)

corresponding with the intermediate instructing expression in a predetermined object search range. Thus, a terminal can be effectively and conveniently used without separately clarifying various instructing expressions representing things or objects with the terminal.

12 Claims, 4 Drawing Sheets

(51) Int. Cl.
    *G10L 15/22*     (2006.01)
    *G06F 17/27*     (2006.01)
    *G06F 3/01*     (2006.01)
    *G06F 17/20*     (2006.01)
    *G06F 17/30*     (2006.01)

(52) U.S. Cl.
    CPC .. *G06F 17/30654* (2013.01); *G06F 17/30684* (2013.01); *G06F 17/30976* (2013.01); *G10L 2015/223* (2013.01)

(56) References Cited

U.S. PATENT DOCUMENTS

2009/0150155 A1*   6/2009   Endo ..................... G10L 15/04
                                                        704/255
2010/0114577 A1    5/2010   Hayn et al.

FOREIGN PATENT DOCUMENTS

| KR | 1020090033459 A | 4/2009 |
| KR | 1020090084242 A | 8/2009 |
| KR | 1020110120552 A | 11/2011 |

OTHER PUBLICATIONS

International Search Report dated Feb. 13, 2014; PCT/KR2013/011670.

\* cited by examiner

METHOD FOR PROCESSING DIALOGUE BASED ON PROCESSING INSTRUCTING EXPRESSION AND APPARATUS THEREFOR

TECHNICAL FIELD

The present invention generally relates to methods and devices for processing information, and more specifically to methods and devices for conversational processing in a multi-modal environment.

BACKGROUND ART

Currently, according to commercialization of multi-modal devices such as portable terminals (e.g., smart phone and tablet PC), system robots, smart home appliances, etc., necessity of conversational processing systems suitable for the multi-modal devices is increasing.

The conventional technologies such as Speech Interpretation and Recognition Interface (SIRI) of Apple, S-Voice of Samsung, and QuickVoice of LG provide voice conversational services by using voice recognition technologies. These conversational processing systems may recognize voices of a user in a terminal, understand a language, and perform various commands requested by the user.

However, since such the conversational processing systems are specified in processing verbal inputs such as texts and voices, they cannot utilize non-verbal information such as motions, gestures, and facial expressions.

Accordingly, a conversational processing system utilizing a multi-modal terminal which can accommodate diversified inputs from a user has been introduced. The purpose of this conversational processing system is to interact with objects which are represented using various referential (instructing) expressions and images. From the fact that users generally use referential expressions to indicate objects, the conversational processing system based on referential expression processing has been proposed.

However, since the conversational processing system based on conventional referential expression processing can correctly perform commands only when it is explicitly indicated which expression is a referential expression, it cannot be utilized valuably in daily-life, and has limitation in being used for real-time conversational processing systems.

DISCLOSURE

Technical Problem

In order to resolve the above-described problem, the present invention provides a conversational processing method which can provide a user of a multi-modal terminal with correct information and convenience in use of the terminal.

Also, the present invention provides a conversational processing apparatus which can efficiently use a multi-modal terminal without additional indications on referential expressions in a multi-modal environment.

Technical Solution

According to an aspect of the present invention for achieving the above-described purpose, a conversational processing method, performed in an information processing apparatus capable of processing digital signals, may comprise extracting an referential expression from an input sentence; generating an intermediate referential expression representing modifying relations among words constituting the extracted referential expression; and searching an object corresponding to the generated intermediate referential expression within a preconfigured object search range.

Here, the method may further comprise, after the searching, providing information on the searched object; being provided with information on accuracy of the information on the searched object; and reconfiguring the object search range based on the information on accuracy.

Here, in the searching, among object properties included within the object search range, object properties which do not form relations with other objects may be constructed as a monadic relation table, and object properties which form relations with other object may be constructed as a dyadic relation table.

Also, in the searching, the object corresponding to the intermediate referential expression may be searched based on at least one of the constructed monadic table and the constructed dyadic relation table.

Here, the method may further comprise generating operation information on an operation indicated by the input sentence.

Also, the method may further comprise providing information on the searched object and the operation information to an external apparatus in order for the operation corresponding to the generated operation information to be performed on the searched object indicated by the input sentence.

According to another aspect of the present invention for achieving the above-described purpose, a conversational processing apparatus based on referential expression processing may comprise a referential expression extracting part extracting a referential expression from an input sentence; an intermediate referential expression generating part generating an intermediate referential expression representing modifying relations among words constituting the extracted referential expression; and an object searching part searching for an object corresponding to the generated intermediate referential expression within a preconfigured object search range.

Here, the apparatus may further comprise an object providing part providing information on the searched object and being provided with information on accuracy of the information on the searched object; and an object search range adjusting part reconfiguring the object search range based on the information on accuracy.

Here, the apparatus may further comprise an operation information generating part generating operation information on an operation indicated by the input sentence, and an information providing part providing information on the searched object and the operation information to an external apparatus in order for the operation corresponding to the generated operation information to be performed on the searched object indicated by the input sentence.

Advantageous Effects

According to the above-described conversational processing methods and apparatuses, a user can efficiently use a terminal by utilizing various referential expressions for representing things or objects without additional indications to the apparatus.

Also, the methods and apparatuses can provide correct information as well as convenience to the user.

BEST MODE

Figure 1:
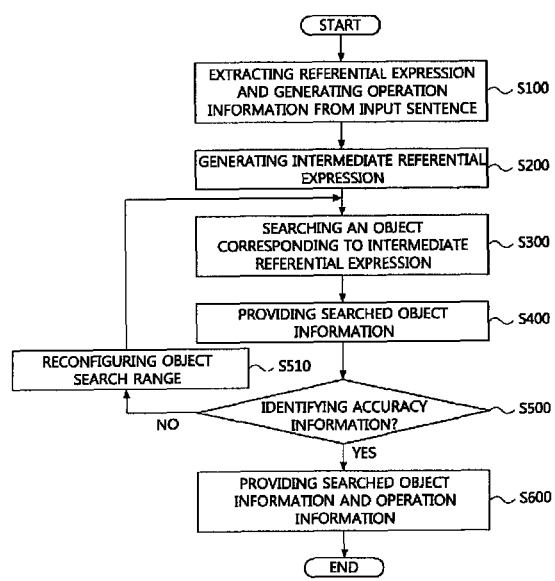
FIG. 1 is a flow chart to explain a conversational processing method based on referential expression processing according to an example embodiment of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the conversational processing methods and apparatuses based on referential expression processing according to the present invention may be implemented in at least one server or by using at least one server. Also, they may be implemented as including at least one server and a plurality of user terminals.

The at least one server and the plurality of user terminals may be connected directly, or interconnected through wireless or wired networks. Here, the user terminal may include a multi-modal terminal which can communicate with the server, is equipped with a sensor which can recognize a variety of conversational forms as well as texts and voices in a multi-modal environment, and has digital signal processing capability, such as a smart phone, a tablet PC, a laptop computer, a desktop computer, a smart home appliance, and a system robot. However, the user terminal is not limited thereto.

Here, a conversational form (modality) means a channel which is translated into a machine by modeling senses of human such as vision, auditory sense, tactile sense, taste sense, and osphresis. The multi-modal interaction may refer to that a user or a user terminal communicates with other multi-modal terminals by putting various conversational forms together in such the multi-modal environment. For the multi-modal interaction, a multi-modal interface, which is provided with information through input devices such as various sensors, keyboard, touch screen, etc. and outputs feedbacks such as voices, graphics, images, and vibrations, may be included in the multi-modal terminal.

Hereinafter, preferred example embodiments according to the present invention will be described in detail by referring to accompanying figures.

FIG. 1 is a flow chart to explain a conversational processing method based on referential expression processing according to an example embodiment of the present invention.

Referring to FIG. 1, a conversational processing method, performed in an information processing apparatus capable of processing digital signals, may comprise extracting an referential expression from an input sentence (S100); generating an intermediate referential expression representing modifying relations among words constituting the extracted referential expression (S200); and searching an object corresponding to the generated intermediate referential expression within a preconfigured object search range (S300).

Also, after a step of generating operation information on an operation indicated by the input sentence and the step of searching the object corresponding to the intermediate referential expression, the method may further comprise providing information on the searched object (S400); being provided with information on accuracy of the information on the searched object (S500); reconfiguring the object search range based on the information on accuracy (S510); and providing information on the searched object and the operation information to an external apparatus in order for the operation corresponding to the generated operation information to be performed on the searched object (S600).

The referential expression may be extracted from the input sentence by referring to a stored referential expression dictionary. Here, the referential expression may mean at least one word or a sentence constituted by a combination of words used for explaining an object instructed by the user. Also, the object may include a thing or a person having a shape, which is an object on which an operation is performed by a subject.

The referential expression dictionary may store words corresponding to at least one word class among noun, adjective, preposition, definite article, or indefinite article, in advance.

In the user terminal, the sentence can be inputted through a sensor recognizing voices of the user, and/or by using a variety of input devices such as a pen, a keypad, a keyboard, a mouse, and a touch screen. Here, the sentence may mean an expression unit, a combination of one or more words, which satisfies predetermined grammatical relations, and the word may mean a minimum expression unit which can be used solely as having a meaning. The word may belong to at least one word class among noun, pronoun, postposition, verb, adjective, determiner, adverb, exclamation, and the like.

The intermediate referential expression representing modifying relations between words constituting the extracted referential expression may be generated (S200). Here, the intermediate referential expression may be generated in a form among a directed acyclic graph and a parse tree which can represent relations between components of the referential expression. However, the present invention is not restricted by the above representation forms.

In the uppermost node of the intermediate referential expression generated in the form of graph or tree, a proper name of an object indicated by the user through the input sentence may be located. Also, in the lower nodes, properties modifying the object and names or properties of other objects modifying the objects may be located.

The object corresponding to the intermediate referential expression can be searched in a predetermined object search range (S300). The object search range may be a database which stores properties of at least one object such as X-Y coordinates, or RGB color values. Also, the at least one object whose properties are stored in the database may be detected among nearby objects by using at least one vision sensor installed in the user terminal. Here, the vision sensor may include a camera, an image scanner, etc. which can detect and process images or videos, without limitation.

In order to search the object corresponding to the intermediate referential expression, among object properties included within the object search range, object properties which do not form relations with other objects may be constructed as a monadic relation table, and object properties which form relations with other objects may be constructed as a dyadic relation table.

In the monadic relation table, at least one property of proper names, colors, and shapes of objects which do not form relations with other objects may be included. Also, in the dyadic relation table, at least one property of lengths, sizes, directions, and positions of objects which form relations with other objects may be included.

The object corresponding to the intermediate referential expression can be searched based on at least one relation table of the constructed monadic relation table and the constructed dyadic relation table. For example, a proper name of an object located in the uppermost node of the intermediate referential expression generated in the form of graph or tree, or a property which does not form relation with other objects among properties located in the lower nodes of the intermediate referential expression can be searched in the monadic relation table. Also, a property which forms relations with other objects among properties located in the lower nodes of the intermediate referential expression can be searched in the dyadic relation table. Thus, the object in at least one relation table of the monadic relation table and the dyadic relation table, which satisfies the intermediate referential expression most, can be searched.

After searching the object corresponding to the intermediate referential expression, information on the searched object can be provided to the user (S400), and information on accuracy of the searched object can be provided by the user (S500).

The information on the searched object may be provided through at least one output device such as a monitor, a touch screen, and a speaker, and the information on accuracy may be provide through at least one input device such as a sensor, a keyboard, and a touch screen. However, the present invention is not restricted by the above examples of devices.

The information on accuracy may indicate whether the searched object coincides with the object which the user wants to designate.

When the object which the user wants to designate does not coincide with the searched object based on the provided information on accuracy, the object search range may be reconfigured (S510).

Here, the reconfiguration of the object search range may mean reducing the object search range by excluding the corresponding object from the object search range in order for the object lacking of accuracy not to be selected again. Also, when an object coinciding with the object which the user designates does not exist in the object search range, it may be possible to detect objects located in wider areas by using at least one vision sensor installed in the user terminal so that the range of objects to be searched can be extended.

When the object which the user wants to designate coincides with the searched object based on the provided information on accuracy, information on the searched object and the operation information may be provided to an external apparatus so that operations corresponding to the operation information are performed on the searched object (S600).

The operation information may be generated by using information on operations indicated by the input sentence. Also, the external apparatus may include at least one device or system which is, wirelessly or over wires, connected with the conversational processing apparatus based on the above-described referential expression processing and can freely share or process information. For example, the external apparatus may include a smart device and a system robot such as a smart phone, a table PC, or a smart home appliance. However, the present invention is not limited thereto.

Figure 2:
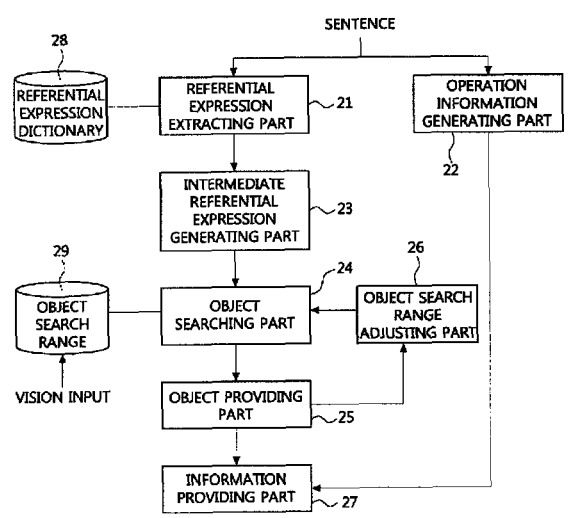
FIG. 2 is a block diagram to illustrate a conversational processing apparatus based on referential expression processing according to an example embodiment of the present invention.

FIG. 2 is a block diagram to illustrate a conversational processing apparatus based on referential expression processing according to an example embodiment of the present invention.

Referring to FIG. 2, the conversational processing apparatus based on referential expression processing may comprise a referential expression extracting part 21, an intermediate referential expression generating part 23, and an object searching part 24.

Also, the apparatus may further comprise an operation information generating part 22, an object providing part 25, an object search range adjusting part 26, and an information providing part 27.

The referential expression extracting part 21 may extract a referential expression from an input sentence.

The referential expression may be extracted from the input sentence by referring to a stored referential expression dictionary. Here, the referential expression may mean at least one word or a sentence constituted by a combination of words used for explaining an object instructed by the user. Also, the object may include a thing or a person having a shape, which is an object on which an operation of a subject is performed.

The referential expression dictionary 28 may mean a database which stores, in advance, words corresponding to at least one word class among noun, adjective, preposition, definite article, or indefinite article which contribute to the referential expressions.

In the user terminal, the sentence can be inputted through a sensor recognizing voices of the user, and/or by using a variety of input devices such as a pen, a keypad, a keyboard, a mouse, and a touch screen. Here, the sentence may mean an expression unit, a combination of one or more words, which satisfies predetermined grammatical relations, and the word may mean a minimum expression unit which can be used solely and has a meaning. The word may belong to at least one word class among noun, pronoun, postposition, verb, adjective, determiner, adverb, exclamation, and the like.

The intermediate referential expression generating part 23 may generate an intermediate referential expression representing modifying relations between words constituting the extracted referential expression. Here, the intermediate referential expression may be generated in a form among a directed acyclic graph and a parse tree which can represent relations between components of the referential expression. However, the present invention is not restricted thereto.

In the uppermost node of the intermediate referential expression generated in the form of graph or tree, a proper name of an object indicated by the user through the input sentence may be located. Also, in the lower nodes, properties modifying the object and names or properties of other objects modifying the objects may be located.

The object searching part 24 may search an object corresponding to the intermediate referential expression generated by the intermediate referential expression generating part 23 in a predetermined object search range.

The object search range 29 may be a database which stores properties of at least one object such as X-Y coordinates, or RGB color values. Also, the at least one object whose properties are stored in the database may be detected among nearby objects by using at least one vision sensor installed in the user terminal. Here, the vision sensor may include a camera, an image scanner, etc. which can detect and process images or videos, without limitation.

The object searching part 24 may separately construct, among properties of objects included within the object search range, a monadic relation table for properties of objects which do not form relations with other objects and a dyadic relation table for properties of objects which form relations with other object.

In the monadic relation table, at least one property of proper names, colors, and shapes of objects which do not form relations with other objects may be included. Also, in the dyadic relation table, at least one property of lengths, sizes, directions, and positions of objects which form relations with other objects may be included. Accordingly, the object corresponding to the intermediate referential expression can be searched based on at least one relation table of the constructed monadic relation table and the constructed dyadic relation table.

The object providing part 25 may provide information on the searched object the user, and be provided with information on accuracy of the searched object by the user.

Here, the information on accuracy may indicate whether the searched object coincides with the object which the user wants to designate.

The object providing part 25 may provide the information on the searched object through at least one output device such as a monitor, a touch screen, and a speaker, and the information on accuracy may be provide through at least one input device such as a sensor, a keyboard, and a touch screen. However, the present invention is not restricted by the above examples of devices.

When the object which the user wants to designate does not coincide with the searched object based on the provided information on accuracy, the object search range adjusting part 26 may reconfigure the object search range 29.

Here, the reconfiguration of the object search range may mean reducing the object search range by excluding the corresponding object from the object search range in order for the object lacking of accuracy not to be selected again. Also, when an object coinciding with the object which the user designates does not exist in the object search range, it may be possible to detect objects located in wider areas by using at least one vision sensor installed in the user terminal so that the range of objects to be searched can be extended.

The operation information generating part 22 may generate operation information on operations indicated by the input sentence. The operation means an operation such as a command which the user desires the apparatus to perform through the input sentence.

When the object which the user wants to designate coincides with the searched object based on the provided information on accuracy, the object providing part 27 may provide information on the searched object and the operation information to an external apparatus so that operations corresponding to the operation information are performed on the searched object.

Here, the external apparatus may include at least one device or system which is, wirelessly or over wires, connected with the conversational processing apparatus based on the above-described referential expression processing and can freely share or process information. For example, the external apparatus may include a smart device and a system robot such as a smart phone, a table PC, or a smart home appliance. However, the present invention is not limited thereto.

Figure 3:
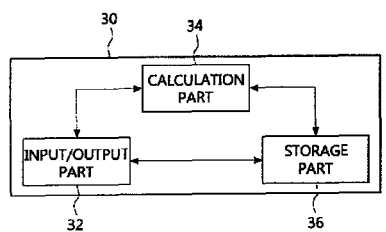
FIG. 3 is a conceptual diagram conceptually illustrating an internal structure of a user terminal according to an example embodiment, relating to the conversational processing apparatus based on referential expression processing.

FIG. 3 is a conceptual diagram conceptually illustrating an internal structure of a user terminal according to an example embodiment, relating to the conversational processing apparatus based on referential expression processing.

Referring, the user terminal 30 may comprise, as its internal structure, an input/output part 32, a calculation part 34, and a storage part 36. Here, the user terminal 30 may include a multi-modal terminal which can communicate with the server, is equipped with a sensor which can recognize a variety of conversational forms as well as texts and voices in a multi-modal environment, and has digital signal processing capability, such as a smart phone, a tablet PC, a laptop computer, a desktop computer, a smart home appliance, and a system robot. However, the user terminal is not limited thereto. Also, the user terminal may be extended to any devices requiring conversational processing.

The input/output part 32 may comprise an input part used for the user to input materials to the terminal and an output part used for the terminal to output processed results. The input part is a device converting materials including numbers, characters, shapes, figures, etc. inputted by the user into forms which the terminal can process, and may include a touch panel and various sensors such as a keyboard, a mouse, a scanner, a camera, a touch screen, and a touch pad. Also, the output part is a device outputting the results obtained by processing the inputted materials to the user as forms which the user can understand, and may include a monitor, a printer, a speaker, a touch screen, etc. However, both of the input part and the output part are not limited thereto.

The input part may receive the input sentence to be processed and the information on accuracy of the searched object, and transfer them to the calculation part 34. Also, the input part may receive information from at least one vision sensor, and transfer the information to the storage part 36.

The calculation part 34 may generate operation information from the input sentence, or extract a referential expression from the input sentence based on a referential expression dictionary in the storage part 36. Also, the calculation part 34 may generate an intermediate referential expression representing modifying relations by using words constituting the extracted referential expression.

Also, the calculation part 34 may construct relation tables by using objects or object properties stored in an object search range of the storage part 36. Here, the relation tables may, through a classification task, be classified into a monadic relation table and a dyadic relation table according to modifying relations of objects and object properties. An object corresponding to the intermediate referential expression is searched in the constructed relation table. In case that the searched object does not coincide with the object which the user intended to indicate, the object search range may be reconfigured. On the contrary, in case that the searched object coincides with the object which the user intended to indicate, information on the searched object and the operation information may be provided to the user terminal or an external apparatus through the output part.

The storage part 36 may include memory devices included in a central processing unit such as a buffer or a cache memory, main memory devices such as ROM and RAM, or secondary memory devices such as a hard-disc drive or a CD-ROM. However, the storage part is not limited thereto.

The storage part 36 may receive words corresponding to at least one word class among noun, adjective, preposition, definite article, or indefinite article which modify or restrict the object through the input part, and construct the referential expression dictionary.

Also, the storage part 36 may receive at least one object property among X-Y coordinates or RGB color values of objects from at least one vision sensor such as a camera and an image scanner, and construct the object search range.

In the above-described embodiments, the input/output part 32, the calculation part 34, and the storage part 36 may be connected wirelessly or over wires.

Figure 4:
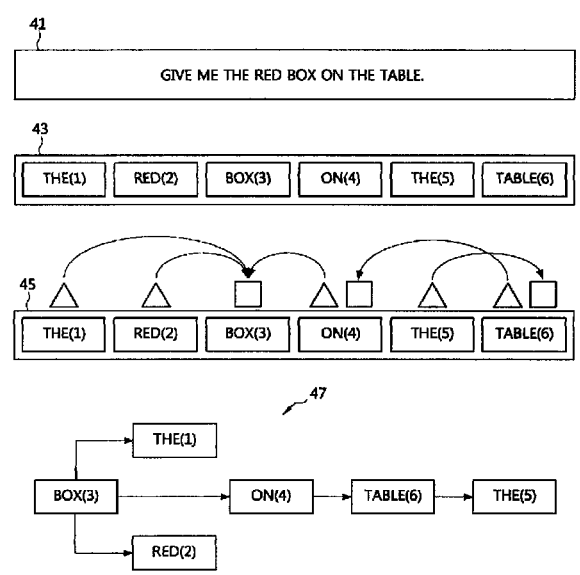
FIG. 4 is an exemplary diagram to explain generation of intermediate referential expressions according to an example embodiment of the present invention.

FIG. 4 is an exemplary diagram to explain generation of intermediate referential expressions according to an example embodiment of the present invention.

Referring to FIG. 4, a sentence "Give me the red box on the table" 41 is inputted, and words "the", "red", "box", "on", "the", and "table" are extracted from the sentence based on the referential expression dictionary (43).

The words constituting the extracted referential expressions may include modifying relations. As illustrated in FIG. 4, the word "box" is modified by the words "the", "red", and "on". Also, the word "on" is modified by the word "table", and the word "table" is modified by the word "the".

In other words, the intermediate referential expression 47 may be generated by using at least one structure of a directed acyclic graph and a parse tree which can represent modifying relations 45 among words constituting the extracted referential expression. The "box" located in the uppermost node of the generated intermediate referential expression 47 may be an object on which an operation is performed by a subject. Also, the words "the" and "red" may be properties of "box" modifying the object "box", and the word "on" may be a modifier forming a relation between "table" and "box".

Figure 5:
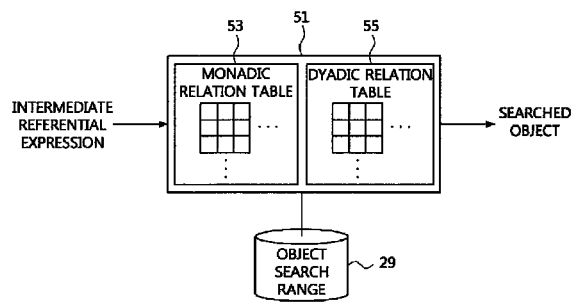
FIG. 5 is a block diagram to specifically illustrate a configuration of an object searching part in the conversational processing apparatus according to an example embodiment of the present invention.

FIG. 5 is a block diagram to specifically illustrate a configuration of an object searching part in the conversational processing apparatus according to an example embodiment of the present invention.

Referring to FIG. 5, the object searching part 51 may search an object corresponding to the intermediate referential expression by constructing a monadic relation table 53 and a dyadic relation table 55 based on objects or object properties stored in the object search range 29.

The object search range 29 may be a database which stores properties of at least one object such as X-Y coordinates, or RGB color values. Also, the at least one object whose properties are stored in the database may be detected among nearby objects by using at least one vision sensor installed in the user terminal. Here, the vision sensor may include a camera, an image scanner, etc. which can detect and process images or videos, without limitation. Here, the object may mean a thing or a person on which an operation of a subject is performed, and the object properties may include innate characteristics or relative characteristics which the respective objects have.

According to the properties of the objects included in the object search range 29, at least one property of proper names, colors, and shapes of objects which do not form relations with other objects may be included in the monadic relation table 53. Also, at least one property of lengths, sizes, directions, and positions of objects which form relations with other objects may be included in the dyadic relation table 55.

Accordingly, the object corresponding to the intermediate referential expression can be searched based on at least one relation table of the constructed monadic relation table 53 and the constructed dyadic relation table 55. For example, a proper name of an object located in the uppermost node of the intermediate referential expression generated in the form of graph or tree, or a property which does not form relation with other objects among properties located in the lower nodes of the intermediate referential expression can be searched in the monadic relation table 53. Also, a property which forms relations with other objects among properties located in the lower nodes of the intermediate referential expression can be searched in the dyadic relation table 55. Thus, the object in at least one relation table of the monadic relation table and the dyadic relation table, which satisfies the intermediate referential expression most, can be searched.

According to the above-described conversational processing methods and apparatuses, a user can efficiently use a terminal by utilizing various referential expressions for representing things or objects without additional indications to the apparatus. Also, the methods and apparatuses can provide correct information to the user.

While the example embodiments of the present invention and their advantages have been described in detail, it should be understood that various changes, substitutions and alterations may be made herein without departing from the scope of the invention.

The invention claimed is:

1. A conversational processing method performed in an information processing apparatus capable of processing digital signals, the method comprising:
   extracting a referential expression from an input sentence;
   generating an intermediate referential expression representing modifying relations among words constituting the extracted referential expression; and
   searching an object corresponding to the generated intermediate referential expression within a preconfigured object search range,
   wherein the referential expression includes at least one word or a sentence including a combination of words used for explaining an object instructed by a user, the object indicating a thing or a person on which an operation is performed,
   wherein the intermediate referential expression is a form of graph or tree including a plurality of nodes,
   wherein the graph or the tree represents modifying relations among words constituting the extracted referential expression, and
   wherein an uppermost node represents a name of the object indicated by the user and lower nodes represent properties of the object or represents a modifier modifying the uppermost node or forming a relation between two other nodes.

2. The method of claim 1, further comprising, after the searching,
   providing information on the searched object;
   being provided with information on accuracy of the information on the searched object; and
   reconfiguring the object search range based on the information on accuracy.

3. The method of claim 1, wherein: in the searching, among object properties included within the object search range, object properties which do not form relations with other objects are constructed as a monadic relation table, and object properties which form relations with other object are constructed as a dyadic relation table.

4. The method of claim 3, wherein: in the searching, the object corresponding to the intermediate referential expression is searched based on at least one of the constructed monadic table and the constructed dyadic relation table.

5. The method of claim 1, further comprising generating operation information on an operation indicated by the input sentence.

6. The method of claim 5, further comprising providing information on the searched object and the operation information to an external apparatus in order for the operation corresponding to the generated operation information to be performed on the searched object indicated by the input sentence.

7. A conversational processing apparatus comprising:
   a referential expression extracting part extracting a referential expression from an input sentence;
   an intermediate referential expression generating part generating an intermediate referential expression representing modifying relations among words constituting the extracted referential expression; and
   an object searching part searching for an object corresponding to the generated intermediate referential expression within a preconfigured object search range,
   wherein the referential expression includes at least one word or a sentence including a combination of words used for explaining an object instructed by a user, the object indicating a thing or a person on which an operation is performed,
   wherein the intermediate referential expression is a form of graph or tree including a plurality of nodes,
   wherein the graph or the tree represents modifying relations among words constituting the extracted referential expression, and
   wherein an uppermost node represents a name of the object indicated by the user and lower nodes represent properties of the object or represents a modifier modifying the uppermost node or forming a relation between two other nodes.

8. The apparatus of claim 7, further comprising:
   an object providing part providing information on the searched object and being provided with information on accuracy of the information on the searched object; and
   an object search range adjusting part reconfiguring the object search range based on the information on accuracy.

9. The apparatus of claim 7, wherein the object searching part constructs, among object properties included within the object search range, a monadic relation table for object properties which do not form relations with other objects and a dyadic relation table for object properties which form relations with other object.

10. The apparatus of claim 9, wherein the object searching part searches the object corresponding to the intermediate referential expression based on at least one of the constructed monadic table and the constructed dyadic relation table.

11. The apparatus of claim 7, further comprising an operation information generating part generating operation information on an operation indicated by the input sentence.

12. The apparatus of claim 11, further comprising an information providing part providing information on the searched object and the operation information to an external apparatus in order for the operation corresponding to the generated operation information to be performed on the searched object indicated by the input sentence.

* * * * *